United States Patent
Bataille et al.

(10) Patent No.: US 8,253,283 B2
(45) Date of Patent: Aug. 28, 2012

(54) POWER GENERATION DEVICE WITH TWO MOBILE PARTS

(75) Inventors: Christian Bataille, Voiron (FR); Didier Vigouroux, Villard Bonnot (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 224 days.

(21) Appl. No.: 12/866,404

(22) PCT Filed: Feb. 12, 2009

(86) PCT No.: PCT/EP2009/051633
§ 371 (c)(1),
(2), (4) Date: Aug. 5, 2010

(87) PCT Pub. No.: WO2009/109449
PCT Pub. Date: Sep. 11, 2009

(65) Prior Publication Data
US 2010/0323644 A1  Dec. 23, 2010

(30) Foreign Application Priority Data
Mar. 4, 2008 (FR) ................................. 08 51405

(51) Int. Cl.
H02K 35/02 (2006.01)
H02K 35/06 (2006.01)
(52) U.S. Cl. .............................. 310/36; 322/3
(58) Field of Classification Search ............. 310/36–38, 310/152, 49.31, 49.39, 190–191, 193; 322/3; 335/232, 234; 123/149 E
See application file for complete search history.

(56) References Cited

U.S. PATENT DOCUMENTS

| | | | | |
|---|---|---|---|---|
| 1,157,414 A * | 10/1915 | Neuland | ............................ | 322/8 |
| 2,670,448 A * | 2/1954 | Bell et al. | .................. | 310/154.33 |
| 3,360,667 A * | 12/1967 | Gordon, Jr. | .................... | 310/114 |
| 4,160,177 A * | 7/1979 | Ascoli | ............................. | 310/22 |
| 4,563,604 A * | 1/1986 | Xuan | .......................... | 310/49.33 |
| 4,623,808 A | 11/1986 | Beale et al. | | |
| 4,827,163 A | 5/1989 | Bhate et al. | | |
| 5,734,215 A * | 3/1998 | Taghezout et al. | ............. | 310/114 |
| 7,453,341 B1 * | 11/2008 | Hildenbrand | ................. | 335/272 |
| 7,804,386 B2 * | 9/2010 | Yonnet et al. | ................. | 335/229 |
| 2008/0315595 A1 | 12/2008 | Bataille et al. | | |

FOREIGN PATENT DOCUMENTS

| | | |
|---|---|---|
| DE | 44 05 846 | 8/1995 |
| DE | 198 52 470 | 5/2000 |
| FR | 2 893 780 | 5/2007 |
| WO | 86 05928 | 10/1986 |

OTHER PUBLICATIONS

U.S. Appl. No. 12/528,453, filed Aug. 25, 2009, Bataille, et al.

* cited by examiner

*Primary Examiner* — Burton Mullins
(74) *Attorney, Agent, or Firm* — Oblon, Spivak, McClelland, Maier & Neustadt, L.L.P.

(57) ABSTRACT

A power generation device that includes an excitation coil with a central opening, and a magnetic circuit extending through the central opening of the coil and including at least one permanent magnet and a plurality of ferromagnetic members arranged in a fixed portion and two mobile portions. The two mobile portions are mounted on two parallel rotary axes and can each assume two positions. The device further includes a mechanism rotating the two mobile portions between the two positions thereof so as to create two states of the magnetic circuit, i.e. a first state in which a magnetic flow flows through the coil in one direction and a second state in which a magnetic flow flows through the coil in the opposite direction.

11 Claims, 4 Drawing Sheets

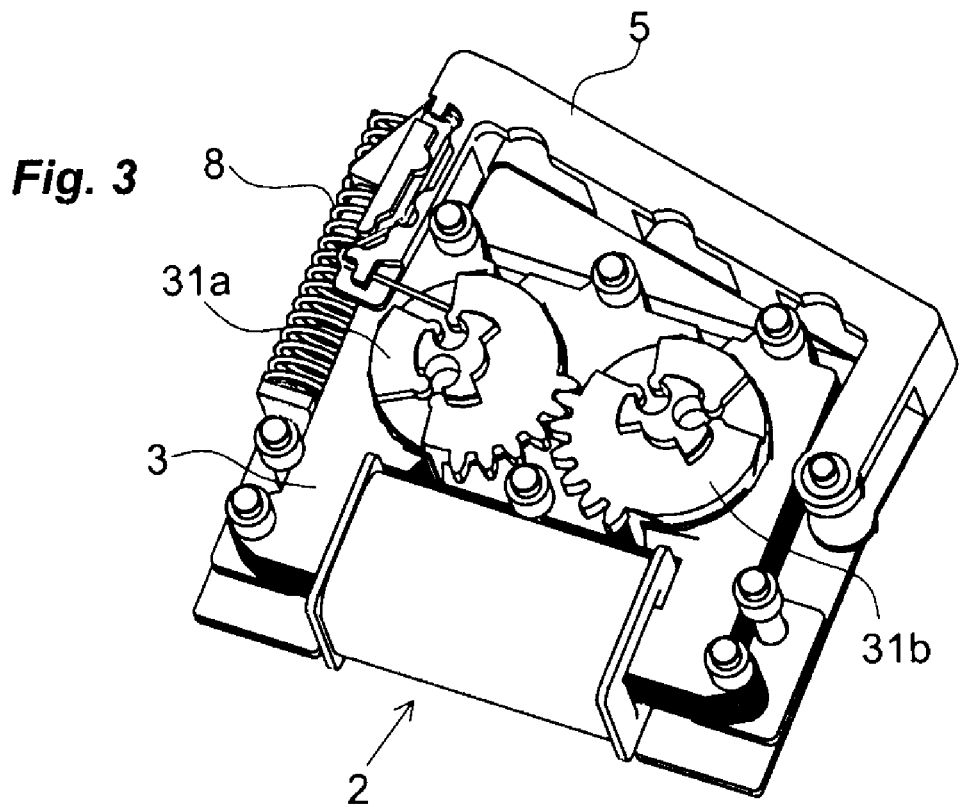
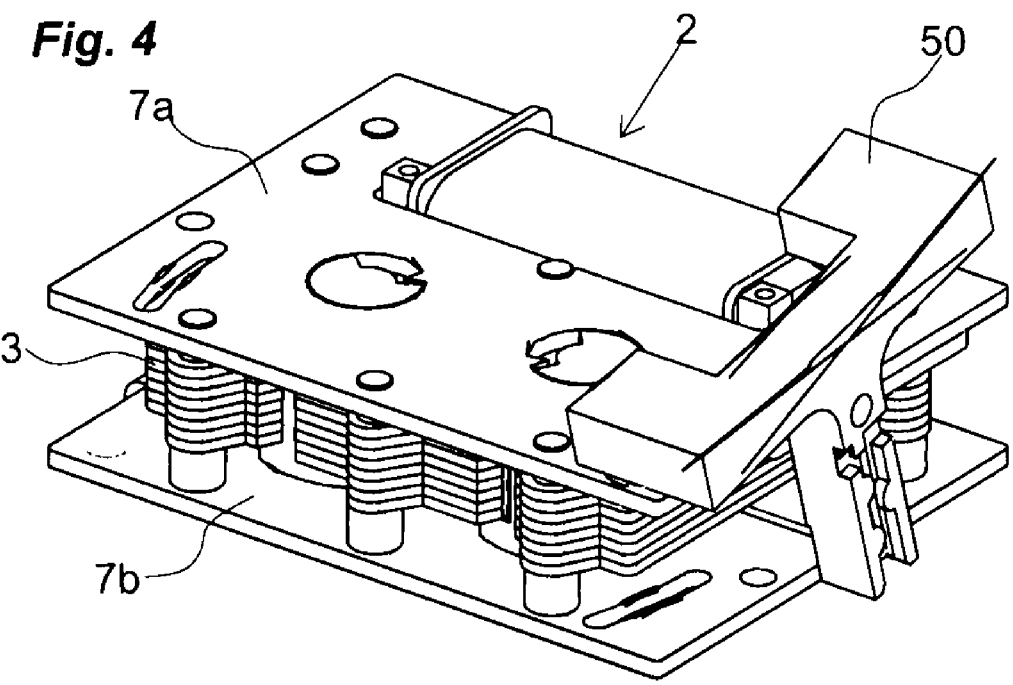

POWER GENERATION DEVICE WITH TWO MOBILE PARTS

The present invention relates to an energy generation device for converting a mechanical energy into electrical energy. The invention also relates to a wireless stand-alone control device incorporating the energy generation device.

The patent application WO 2004/093299 discloses a converter of mechanical energy into electrical energy. This converter comprises a permanent magnet and a soft magnetic element both forming a magnetic circuit and an electrical coil surrounding a portion of the magnetic circuit. The soft magnetic element and the permanent magnet are mounted to rotate relative to one another, which makes it possible, when one moves relative to the other, to create a flux variation in the magnetic circuit passing through the coil, resulting in the generation of an electrical current in the coil.

The document WO 2004/093299 provides for the use of the converter in a stand-alone energy switch, that is to say without energy source and wireless. When the switch is mechanically activated, the electrical current generated by the variation of the magnetic flux passing through the coil can be used to power a radio signal transmitter. The radio signal is sent to a remote receiver which is then responsible for switching on an electrical appliance. When the switch is very distant from the receiver or is separated from the latter by numerous obstacles, the radio signal generated does not always have sufficient intensity to systematically reach the receiver. To improve the performance levels of the converter, it is necessary, for example, to increase the number of turns of the coil which increases the size of the switch and which, given the cost of the copper wire used for the winding, makes it much more expensive.

The aim of the invention is to propose an energy generation device of the type of that described hereinabove that has enhanced performance while retaining a small footprint and modest cost.

This aim is achieved by an energy generation device comprising:
  an excitation coil provided with a central opening,
  a magnetic circuit passing through the central opening of the coil and comprising at least one permanent magnet and several ferromagnetic elements,
  characterized in that:
  the permanent magnet and the ferromagnetic elements are arranged in a fixed part and two moving parts,
  the two moving parts are mounted on two rotating axes parallel to each other and can each assume two positions,
  the device comprises means for actuating the two moving parts in rotation between their two positions so as to create two states of the magnetic circuit, a first state in which a magnetic flux passes through the coil in one direction and a second state in which a magnetic flux passes through the coil in the opposite direction.

According to the invention, the birotor system, that is to say the system with two moving parts, used in the invention, makes it possible to significantly improve the performance levels of the current energy generation devices. The use of two moving parts also makes it possible to be able to optimize the footprint of the device by making it particularly compact without affecting its performance levels.

The use of the two moving parts makes it possible to reduce the actuation force of the device and increase the rotation speed of the moving parts which produces a significant flux variation and therefore a high induced voltage in the coil winding wire.

According to a particular feature, the magnetic flux created in one direction is equal to the inverse of the magnetic flux created in the opposite direction. This is the case when the magnetic circuit has a single fixed magnet or two identical moving magnets.

According to another particular feature of the invention, the two moving parts supply a resisting force to the actuation means in a first part of the actuation and a motive force to the actuation means in a second part of the actuation.

According to a first variant embodiment, the two moving parts each comprise a permanent magnet.

According to a second variant embodiment, the two moving parts comprise ferromagnetic elements and the permanent magnet is fixed.

According to a particular feature of the invention, the actuation means comprise an actuation device and means for driving the moving parts in rotation.

According to another particular feature of the invention, the actuation device is linked to a first moving part and the driving means comprise toothed wheels for driving the second moving part when the first moving part is actuated.

In a first configuration, the actuation device is, for example, actuated on an axis perpendicular to the rotation axes of the moving parts. This configuration is ideal for an industrial pushbutton type application.

In a second configuration, the actuation device is, for example, actuated on an axis parallel to the rotation axes of the moving parts. This configuration is ideal for a residential electrical switch type application.

According to the invention, the actuation device is, for example, mounted on a spring to return the moving parts to their initial position after an actuation. Thus, it is possible to generate twice the energy.

The invention also relates to a wireless stand-alone control device, comprising an energy generation device of the type described hereinabove for converting a mechanical energy into electrical energy, the electrical energy being capable of powering a radio transmission module coupled to a remote reception module.

Other features and advantages will emerge from the following detailed description by referring to an embodiment given as an example and represented by the appended drawings in which.

Figure 1:
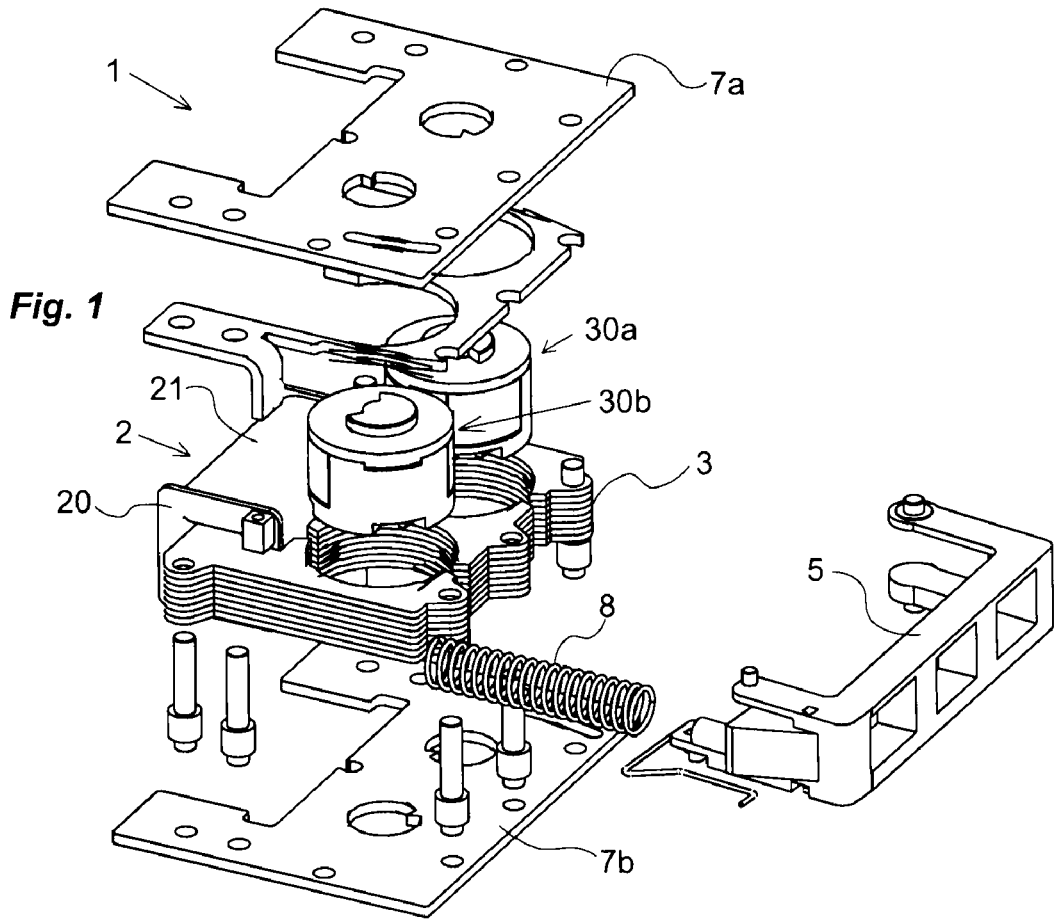
FIG. 1 shows the energy generation device of the invention in an exploded view.
Figure 2:
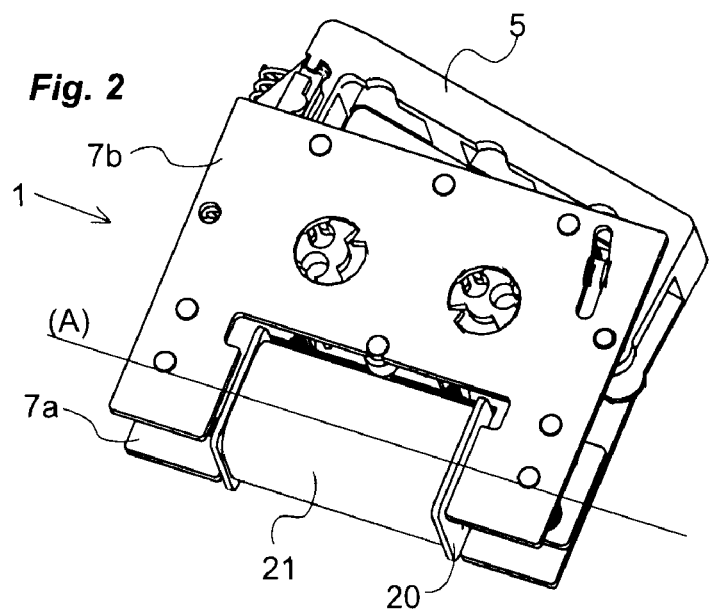
FIG. 2 shows the energy generation device of the invention fully assembled.
Figure 5A:
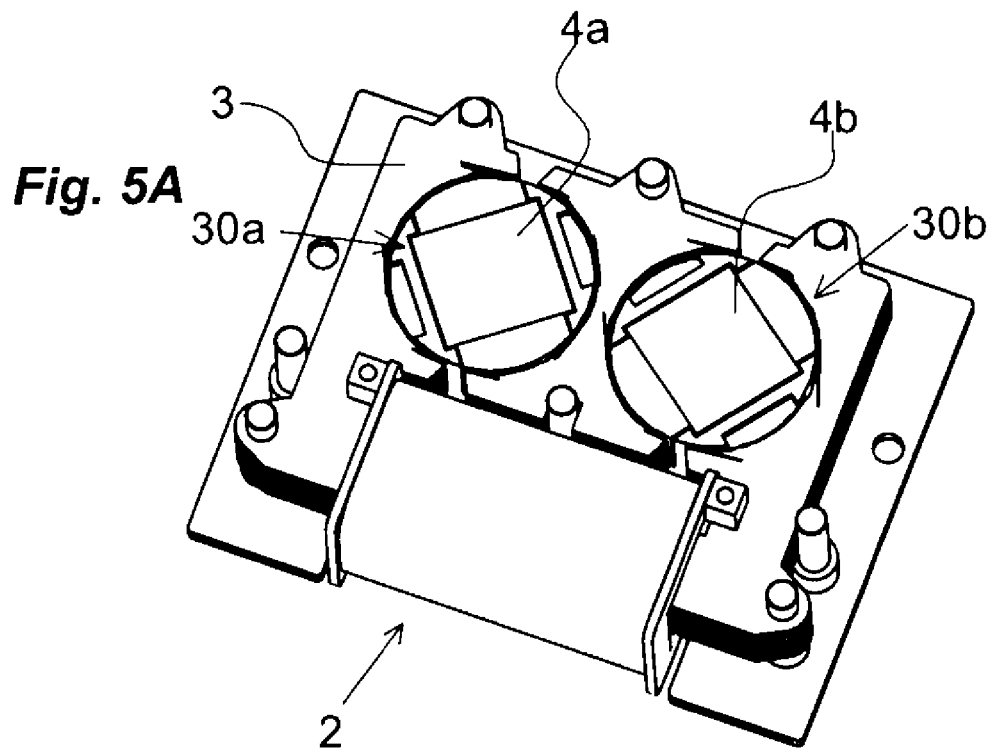
Figure 5B:
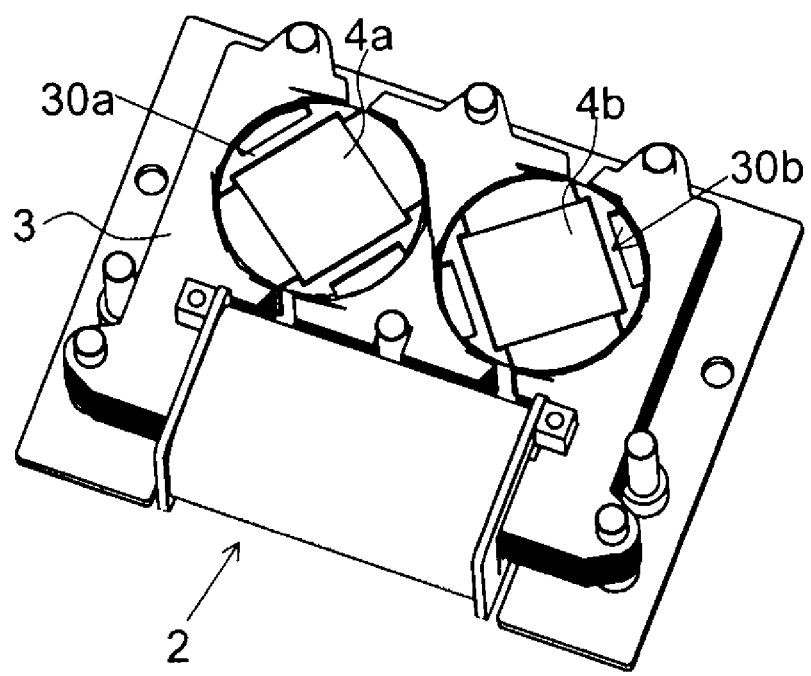
Figure 6A:
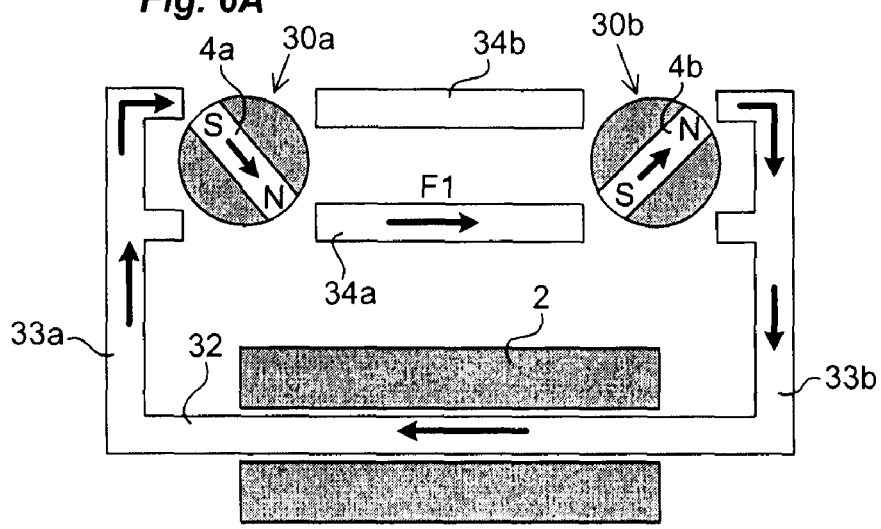
Figure 6B:
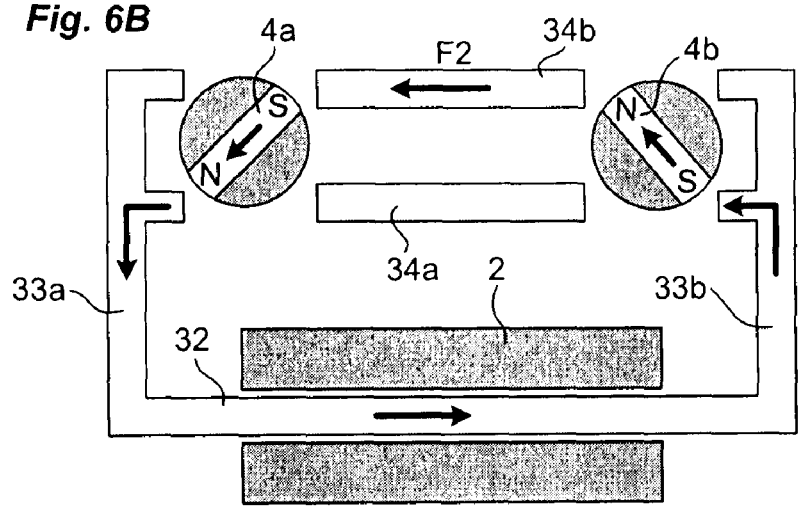
Figure 7:
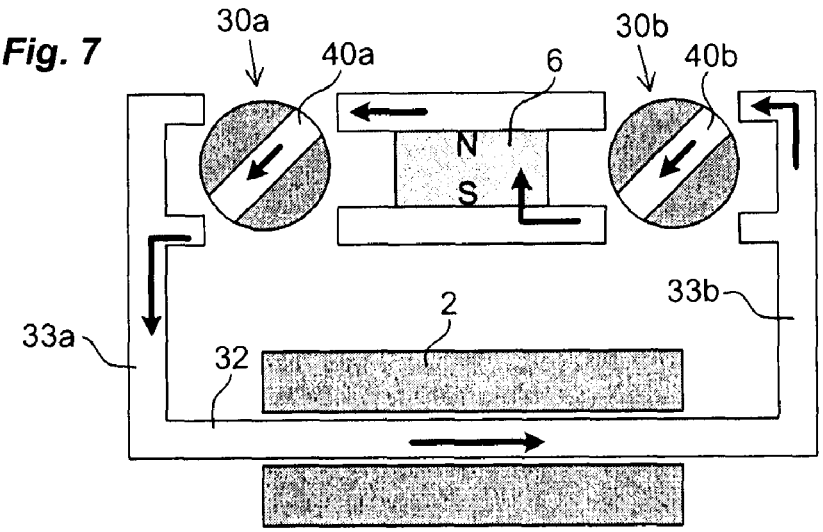

FIG. 3 shows the device of FIG. 2 with a cover removed so the interior of the device can be viewed, FIG. 4 shows the device of the invention according to a variant embodiment in which the actuation is performed on an axis parallel to the rotation axes of the moving parts, FIGS. 5A and 5B show the device respectively in the first position of the moving parts and in the second position of the moving parts when the moving parts each comprise a permanent magnet, FIGS. 6A and 6B diagrammatically show the operating principle of the device when the moving parts are permanent magnets and indicate the path of the magnetic flux for each of the positions of the moving parts, FIG. 7 shows a variant of the device in which the permanent magnet is fixed and the moving parts are made up of ferromagnetic elements.

The stand-alone electrical energy generation device 1 according to the invention can be used to generate an electrical current in an excitation coil 2 by varying the magnetic flux passing through the coil 2 by an external mechanical action, for example manual.

Such a device 1 can be used in a wireless control device with no internal current source. This control device is, for example, actuated manually by a toggle- or pushbutton-type switch able to control an electrical appliance such as, for example, a light, and can be positioned without constraint in different places in a room. The control device comprises a mechanical subassembly (not represented) intended to receive the stand-alone energy generation device 1 and electronic circuits powered by the energy generation device. The electronic circuits (not represented) notably comprise means of storing the electrical energy generated by the device 1 according to the invention, such as capacitors, making it possible to smooth the quantity of current being delivered in order to send radio signals to a remote receiver controlling an electrical appliance. The various electronic circuits employed are known and are, for example, described in the patent applications EP1238436 and EP0836166.

The electrical energy generation device 1 according to the invention can be implemented for applications such as lamp control, but also position detector or mechanical pressure sensor in which the generated quantity of current measured is used to determine whether a mechanical force has been exerted. The mechanical action is used to create an electrical current which is used to trigger, for example, an alarm or a signaling device or to power a radio transmitter as described previously. Similarly, it is possible to envisage an application in which a mechanical action is transformed into electrical energy used, for example, to power a radio transmitter. Such an application is, for example, a circuit breaker lock able to activate an energy generation device to send a message to a central security facility.

Referring to FIGS. 1 to 7, the energy generation device 1 of the invention notably comprises an excitation coil 2 provided with a central opening and a magnetic circuit 3 passing through the central opening of the coil 2.

The coil 2 has an armature 20 made of an amagnetic material, on which is wound a winding 21 of N turns of a conductive wire. The central opening is formed through the armature 20 along a longitudinal axis (A) and has dimensions designed to be able to be passed through by the magnetic circuit 3. The magnetic circuit is for example produced in the form of stacked plates riveted between two cover plates 7a, 7b.

The magnetic circuit 3 comprises at least one permanent magnet 4a, 4b, 6 and ferromagnetic elements arranged in at least a fixed part and two moving parts 30a, 30b. The two moving parts 30a, 30b are each mounted to rotate about an axis, their rotation axes being parallel to one another. Each moving part 30a, 30b forms at least two gaps in the magnetic circuit. The movement of the moving parts relative to the fixed part 3 creates a variation of the magnetic flux through the coil 2 which results in the creation of an electrical current in the coil 2. The magnetic flux in the magnetic circuit is defined by the variation in position of the moving parts 30a, 30b relative to the fixed part and the voltage created at the terminals of the coil 2 by the variation of this magnetic flux depends on the time and therefore the speed of displacement of the moving parts 30a, 30b relative to the fixed part.

The energy generation device 1 thus comprises means of actuating the moving parts 30a, 30b in rotation. These actuation means notably comprise an actuation device 5, 50 and driving means linking the actuation device 5, 50 to the moving parts 30a, 30b. The actuation device 5, 50 can, for example, be activated, in a first configuration (FIG. 2), on an axis perpendicular to the rotation axes of the moving parts 30a, 30b or, in a second configuration (FIG. 4), on an axis parallel to the rotation axes of the moving parts 30a, 30b. The first configuration is, for example, suitable for use in a push-button-type control device and the second configuration in a residential control switch-type control device. The driving means can take different forms. In FIG. 3, they consist, for example, of a first toothed wheel 31a mounted on the same rotation axis as the first moving part 30a and meshed with a second toothed wheel 31b mounted on the rotation axis of the second moving part 30b. The actuation device 5, 50 is linked to one of the toothed wheels. The rotation of one of the two toothed wheels and therefore of a moving part drives the other toothed wheel and therefore the other moving part. The actuation device 5 can, for example, be mounted on a spring 8 so as to return to the initial position after each actuation.

According to the invention, the two moving parts 30a, 30b can assume two coordinated determined positions, defined by end-stops, by virtue of the driving means so as to confer two different states on the magnetic circuit 3. When the actuation device 5, 50 is pressed, the moving parts change from one position to the other. When the moving parts 30a, 30b are together in a first position (FIGS. 5A, 6A), the magnetic circuit 3 is in a first state and when the moving parts 30a, 30b are together in a second position (FIGS. 5B, 6B), the magnetic circuit is in a second state. In the first state of the magnetic circuit 3, the coil 2 is passed through in a first direction by a magnetic flux F1 (FIG. 6A) and in the second state of the magnetic circuit 3, the coil is passed through by a magnetic flux F2 in a direction opposite to the first direction (FIG. 6B). Thus, the coil 2 undergoes a strong flux variation that can be used to induce an electrical current in its winding 21. If the actuation device 5, 50 returns to its initial position after an actuation, for example with the help of a spring 8, the moving parts 30a, 30b execute a to-and-fro cycle, that is to say, change from one position to the other and then return to the initial position. It is possible to use this configuration for certain applications.

The magnetic circuit 3 passes through the central opening of the coil 2 and includes, outside the coil 2, two different paths corresponding to the two positions of the moving parts 30a, 30b. Depending on the position of the moving parts, the magnetic flux F1, F2 therefore takes a different path in the magnetic circuit 3. In a simplified manner, the fixed part of the magnetic circuit 3 thus comprises a number of ferromagnetic elements, that is to say:

a first portion 32 passing through the central opening of the coil 2 which is passed through by the magnetic fluxes F1, F2 in each of the two directions, two lateral portions 33a, 33b in extension of the two sides of the first portion 32, outside the coil 2, two central portions 34a, 34b parallel to one another separated from the two lateral portions to define the two different paths taken by the magnetic flux according to the positions taken by the moving parts 30a, 30b.

In the first position (FIG. 6A) of the moving parts 30a, 30b, each moving part 30a, 30b is separated from an adjacent lateral portion 33a, 33b by a first gap and from a central portion 34a, 34b by a second gap. In the second position (FIG. 6B) of the moving parts 30a, 30b, each moving part is separated from the same lateral portion 33a, 33b by a first gap and from the other central portion 34a, 34b by a second gap.

According to the scheme defined above, various configurations can be applied to the magnetic circuit, notably in order to limit the number of parts. The central portions 34a, 34b may, for example, be formed in a single piece (FIGS. 5A and 5B) separated from the two lateral portions 33a, 33b by bigger air gaps than those that exist between the moving parts 30a, 30b and the lateral portions 33a, 33b and between the moving parts 30a, 30b and the central portions 34a, 34b. The fixed part of the magnetic circuit 3 forms, for example, two circular openings in which the moving parts 30a, 30b are actuated in rotation. Obviously, it would also be possible to envisage using more than two moving parts.

In a first variant embodiment, the two moving parts 30a, 30b each comprise a permanent magnet 4a, 4b. The two permanent magnets 4a, 4b naturally have a tendency to be attracted by magnetic effect and to be aligned in the magnetic circuit 3. In the first position of the moving parts 30a, 30b, the north pole (N) of a first permanent magnet 4a is facing the south pole (S) of the second permanent magnet 4b (FIG. 6A) and in the second position of the moving parts, the south pole of the first permanent magnet 4a is facing the north pole of the second permanent magnet 4b (FIG. 6B). Thus, during the switch from one position to the other, the moving parts first generate a resisting force in the first part of the actuation and then a motive force in the second part of the actuation. In each of the positions of the moving parts, the magnetization axes of the two permanent magnets exhibit a V shape, or an inverted V shape.

Thus, in the first position of the moving parts 30a, 30b (FIG. 6A), the magnetic flux F1 takes the following path:
    the first portion 32 of the magnetic circuit 3,
    first lateral portion 33a,
    first permanent magnet 4a,
    first central portion 34a,
    second permanent magnet 4b,
    second lateral portion 33b,
    first portion of the magnetic circuit.

In the second position of the moving parts (FIG. 6B), the magnetic flux F2 takes the following reverse path:
    first portion 32 of the magnetic circuit 3,
    second lateral portion 33b,
    second permanent magnet 4b,
    second central portion 34b,
    first permanent magnet 4a,
    first lateral portion 33a,
    first portion of the magnetic circuit 32.

The use of two permanent magnets 4a, 4b thus makes it possible to reduce the actuation force of the device and increase the rotation speed of the moving parts in the second part of the actuation which produces a significant flux variation and therefore a high induced voltage in the wire of the winding 21 of the coil 2. If the two permanent magnets 4a, 4b are identical and if the air gaps formed between each moving part and the fixed part are identical, the magnetic flux F1 generated in the magnetic circuit when the magnetic circuit 3 is in the first state is equal to the inverse of the magnetic flux F2 when the magnetic circuit 3 is in the second state. In the configuration in which the moving parts 30a, 30b execute a to and fro cycle between their two positions, twice the energy is generated, resulting from the energy generated when the moving parts 30a, 30b switch from their first position to their second position and from the energy generated when the moving parts 30a, 30b return to their first position.

In a second variant embodiment (FIG. 7) of the inventive device, a single permanent magnet is positioned in the fixed part of the magnetic circuit 3 and the moving parts 30a, 30b comprise two rotary ferromagnetic elements 40a, 40b. The permanent magnet 6 is, for example, positioned between the two central portions 34a, 34b of the magnetic circuit 3. The magnetization of the permanent magnet 6 is oriented along an axis perpendicular to the rotation axes of the moving parts 30a, 30b. When one end of a moving part 30a is facing the north pole of the permanent magnet 6, one end of the other moving part is facing the south pole of the permanent magnet 6, and vice versa. In this variant, given that there is only a single permanent magnet, the two ferromagnetic elements 30a, 30b are placed in parallel in each of their positions. As in the first variant, during the switch from one position to the other, the moving parts first generate a resisting force in the first part of the actuation followed by a motive force in the second part of the actuation.

Similarly, in this second variant embodiment, the use of two polarized moving ferromagnetic elements makes it possible to reduce the actuation force of the device and increase the rotation speed of the moving parts, which produces a significant flux variation and therefore a high induced voltage in the wire of the winding 21 of the coil 2. In this second variant, the use of a magnet 6 equivalent to the two magnets 4a, 4b used in the first variant embodiment makes it possible to generate in both directions a magnetic flux equivalent to the magnetic fluxes F1 and F2 defined previously. As previously, it is possible to generate twice the energy by returning the moving parts 30a, 30b to their initial position after an actuation.

The invention claimed is:

1. An energy generation device comprising:
    an excitation coil including a central opening;
    a magnetic circuit passing through the central opening of the coil and comprising at least one permanent magnet and plural ferromagnetic elements, wherein the permanent magnet and the ferromagnetic elements are arranged in a fixed part and two moving parts, wherein the two moving parts are mounted on two rotating axes parallel to each other and can each assume two positions; and
    means for actuating the two moving parts in rotation between their two positions so as to create two states of the magnetic circuit, a first state in which a magnetic flux passes through the coil in one direction and a second state in which a magnetic flux passes through the coil in the opposite direction.

2. The device as claimed in claim 1, wherein the magnetic flux created in one direction is equal to the inverse of the magnetic flux created in the opposite direction.

3. The device as claimed in claim 1, wherein the two moving parts supply a resisting force to the actuation means in a first part of the actuation and a motive force to the actuation means in a second part of the actuation.

4. The device as claimed in claim 1, wherein the permanent magnet is fixed and the two moving parts comprise ferromagnetic elements.

5. The device as claimed in claim 1, wherein the two moving parts each comprise a permanent magnet.

6. The device as claimed in claim 1, wherein the actuation means comprises an actuation device and means for driving the moving parts in rotation.

7. The device as claimed in claim 6, wherein the actuation device is linked to a first moving part and the driving means comprises toothed wheels for driving the second moving part when the first moving part is actuated.

8. The device as claimed in claim 6, wherein the actuation device is actuated on an axis perpendicular to rotation axes of the moving parts.

9. The device as claimed in claim 6, wherein the actuation device is actuated on an axis parallel to rotation axes of the moving parts.

10. The device as claimed in claim 6, wherein the actuation device is mounted on a spring to return the moving parts to their initial position after an actuation.

11. A wireless stand-alone control device, comprising:
an energy generation device for converting a mechanical energy into electrical energy, the electrical energy being capable of powering a radio transmission module coupled to a remote reception module, wherein the energy generation device is defined in claim 1.

* * * * *